United States Patent [19]

Rasmussen

[11] Patent Number: 5,324,003
[45] Date of Patent: Jun. 28, 1994

[54] CAMPER JACK ASSEMBLY

[76] Inventor: C. Martin Rasmussen, 374 S. Stirling Dr., Fruit Heights, Utah 84037

[21] Appl. No.: 984,295

[22] Filed: Nov. 30, 1992

[51] Int. Cl.$^5$ ............................................. B60P 1/64
[52] U.S. Cl. .................................. 254/45; 254/93 H
[58] Field of Search ...................... 254/45, 93 H, 423; 251/120, 121, 122, 205, 291, 903; 261/DIG. 38

[56] References Cited

U.S. PATENT DOCUMENTS

| | | |
|---|---|---|
| 2,583,923 | 1/1952 | Anschuetz . |
| 3,549,027 | 12/1970 | Batson . |
| 3,758,074 | 9/1973 | Jeffries et al. . |
| 3,897,044 | 7/1975 | Tallman . |
| 3,916,939 | 11/1975 | Gillard ................................ 251/291 |
| 3,948,479 | 4/1976 | Bedo et al. ........................... 251/121 |
| 4,015,822 | 4/1977 | Rasmussen ............................ 254/45 |
| 4,706,343 | 11/1987 | Neidigk ............................... 254/93 H |
| 4,746,097 | 5/1988 | Chung et al. ......................... 254/93 H |

Primary Examiner—Robert C. Watson
Attorney, Agent, or Firm—Workman, Nydegger & Jensen

[57] ABSTRACT

A camper jack for mounting on a camper body, the jack having an extensible leg projectable from a hollow jack housing and attached to the camper body along the length of the housing. A piston cooperating in a cylinder in the extensible leg extends the leg from the housing. A hydraulic fluid reservoir is formed in the extensible leg in an annular space surrounding the cylinder. A valve block is coextensive with the extensible leg at the foot of the leg and contains the valves and pumping piston for the jack. Valving in the valve block permits manual extension and retraction of the extensible leg. Grooves are provided in a novel needle valve allowing control of the rate of flow of the hydraulic fluid. Pumping motion is controlled by a pump handle receiver.

20 Claims, 7 Drawing Sheets

CAMPER JACK ASSEMBLY

BACKGROUND

1. Field of the Invention

The present invention relates to camper jacks which are mountable on a camper body and are useful for loading, removal, and leveling of the camper body. More particularly, the present invention relates to hydraulic camper jacks.

2. Background Art

Many types of camper jacks are available on the market today, ranging from simple mechanical jacks to sophisticated hydraulic jacks. Unfortunately, the hydraulic jacks present in the prior art today are not efficient, dependable, or inexpensive, and several problems with the prior art hydraulic jacks in the prior art have prevented their widespread use.

For example, with the prior art hydraulic jacks, fine tune controlling of the extension of the legs of the jacks is not available. Often, the extension of the legs is not smooth and controlled, but instead is performed haphazardly and in a manner which may be dangerous to the user.

Additionally, control of the extension is generally only carried on in a manner wherein the fingers are positioned close to the jack, thereby positioned such that injury could occur if extension were not controlled properly.

A further problem in the prior art arises from the wear caused in the prior art hydraulic jacks. The wear between the inner and outer tubes of the jacks create the need for the jacks to be replaced fairly often, and for extension of the jacks to not be smooth and controlled.

BRIEF SUMMARY AND OBJECTS OF THE INVENTION

A primary object of the present invention is to provide an improved hydraulic camper jack assembly for facile raising, lowering, and leveling of camper bodies.

It is another object of this invention to provide an improved camper jack assembly wherein the extension and retraction of the extensible leg is smooth and precisely controlled.

Another object of this invention is to provide an improved hydraulic jack assembly wherein the pumping motion of the camper jack is controlled so as to prevent overextension of the pumping arm and to optimize pumping motion.

A further object of the present invention is to provide an improved hydraulic jack assembly wherein wear between the inner and outer tubes of the camper jack is minimized.

Additional objects and advantages of the invention will be set forth in the description which follows and, in part, will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, the present invention is a camper jack for mounting upon movable bodies such as camper bodies for facile raising, lowering, and leveling of the movable bodies. The jack is securely attachable to a camper body. Snug securement is possible since the hydraulic fluid reservoir is an integral part of the extensible leg and is formed in the annular space surrounding the jack cylinder. An elongated piston cooperates in the cylinder and is attached to a housing which completely encloses the extensible leg upon retraction. A valve block coextensive with the extensible leg and at the base thereof contains the hydraulic fluid valving and pumping mechanisms. Access to all of the hydraulic fluid valving and pumping apparatus is easily available from the external periphery of the valve block.

Facile manual extension and retraction are possible since the valving mechanism is located below the hydraulic fluid reservoir and the jack cylinder easily permitting transfer of hydraulic fluid from one to the other without operation of the pumping mechanism.

Within the hydraulic fluid valving and pumping mechanisms, a novel needle valve is provided having a plurality of grooves thereon which allows for constant and metered flow of hydraulic fluid between the reservoir and the cylinder as the hydraulic fluid flows through the grooves.

Rotating means for fine tuned controlling of the rotation of the needle valve is provided within the scope of the present invention. The head of the needle valve may be shaped into a hexagonal shape. A thumb wheel may be attached to the needle valve so as to provide a secure fingerhold on the needle valve. Holes along the outer circumference of the thumb wheel permit insertion of a lever arm into the thumb wheel such that rotation of the thumb wheel, and thus the connected needle valve, can be accomplished by movement of the lever arm. With use of the lever arm to control rotation of the needle valve, the hands of the user can be held at a distance from the mechanism, more leverage to rotate the valve is provided, and more fine control is provided, since a large rotation of the lever arm will still be a small rotation of the needle valve.

A long-armed wrench may be also provided for fine tune control of the needle valve. The head of the wrench conforms to the shape of the head of the needle valve such that the wrench can be easily and securely attached to the needle valve so that rotation of the wrench causes rotation of the needle valve. An alternate second wrench head may be positioned on the second end of the wrench as a backup.

A pump handle receiver is positioned for attachment of a pump handle to provide pumping action to the jack. Positive stops on the pump handle receiver prevent overextension of the pump handle so that movement of the pump handle is controlled in an optimum arc.

Within the hydraulic jack between the inner and outer tubes, an improved wear guide is provided which is simple to manufacture, inexpensive, and easy to use. The improved wear guide protects the tubes from destructively rubbing against each other.

BRIEF DESCRIPTION OF THE DRAWINGS

In order that the manner in which the above-recited, and other, advantages and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

DETAILED DESCRIPTION OF THE PREFERRED EMBODIMENTS

The present invention is best understood by reference to the Figures wherein like parts are designated with like numerals throughout.

Figure 1:
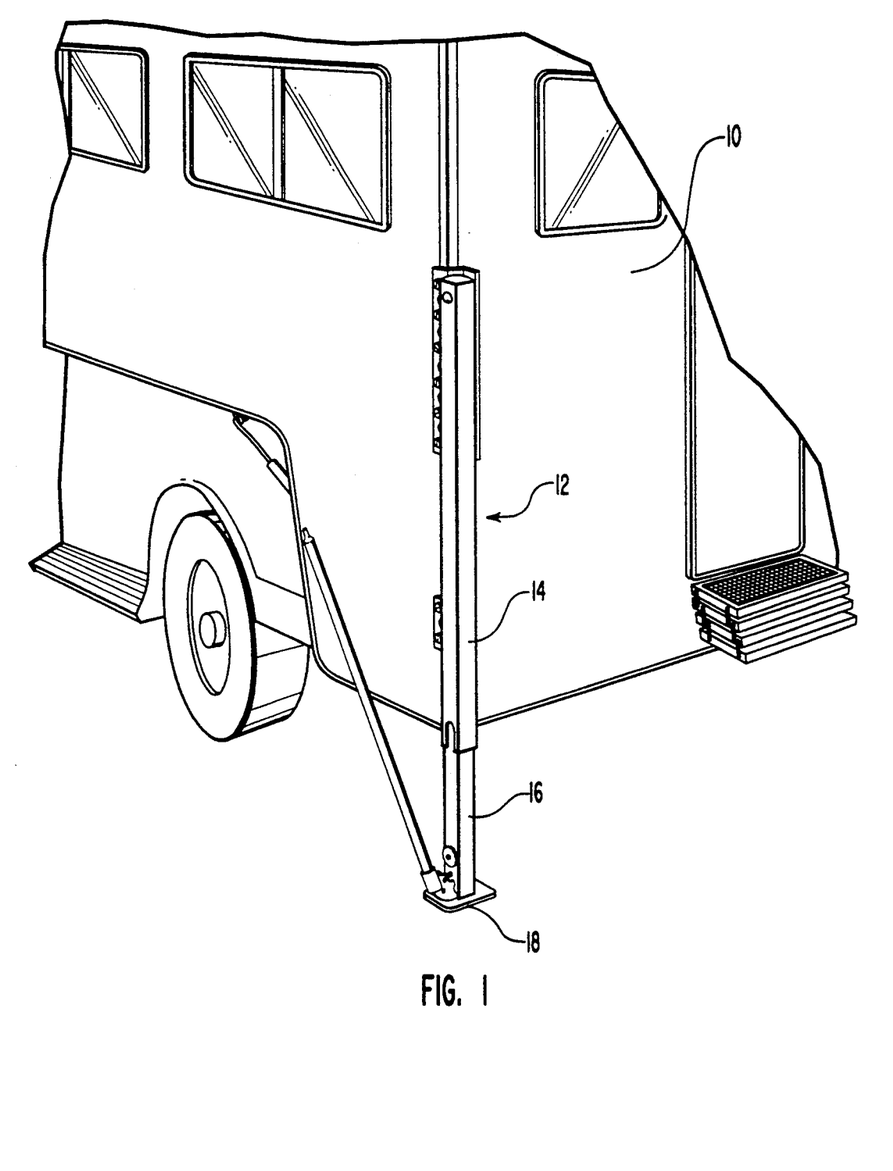
FIG. 1 illustrates a conventional camper body with the camper jack assembly of the present invention mounted thereon.

With reference to FIG. 1, a camper body 10 is illustrated and is provided at a rear end with a jack assembly, generally designated 12. The jack assembly 12 includes an exterior housing 14 and a leg 16 extensible to contact the ground 18. The front end of the camper may be supported in like manner by another jack assembly to facilitate loading of the camper. Alternatively, conventional support structure 20 usually incorporated in camper loaders could be used.

To adapt the camper jack assembly 12 to be usable upon a camper, the jack is attached to camper body 10 and is situated juxtaposed the camper body 10 substantially along the entire portion of the length of exterior housing 14 which overlaps the camper body exterior. Since the housing 14 does not have a diametrally enlarged fluid reservoir as in the prior art devices, it is possible to snugly engage housing 14 with the camper body 10.

Figure 2:
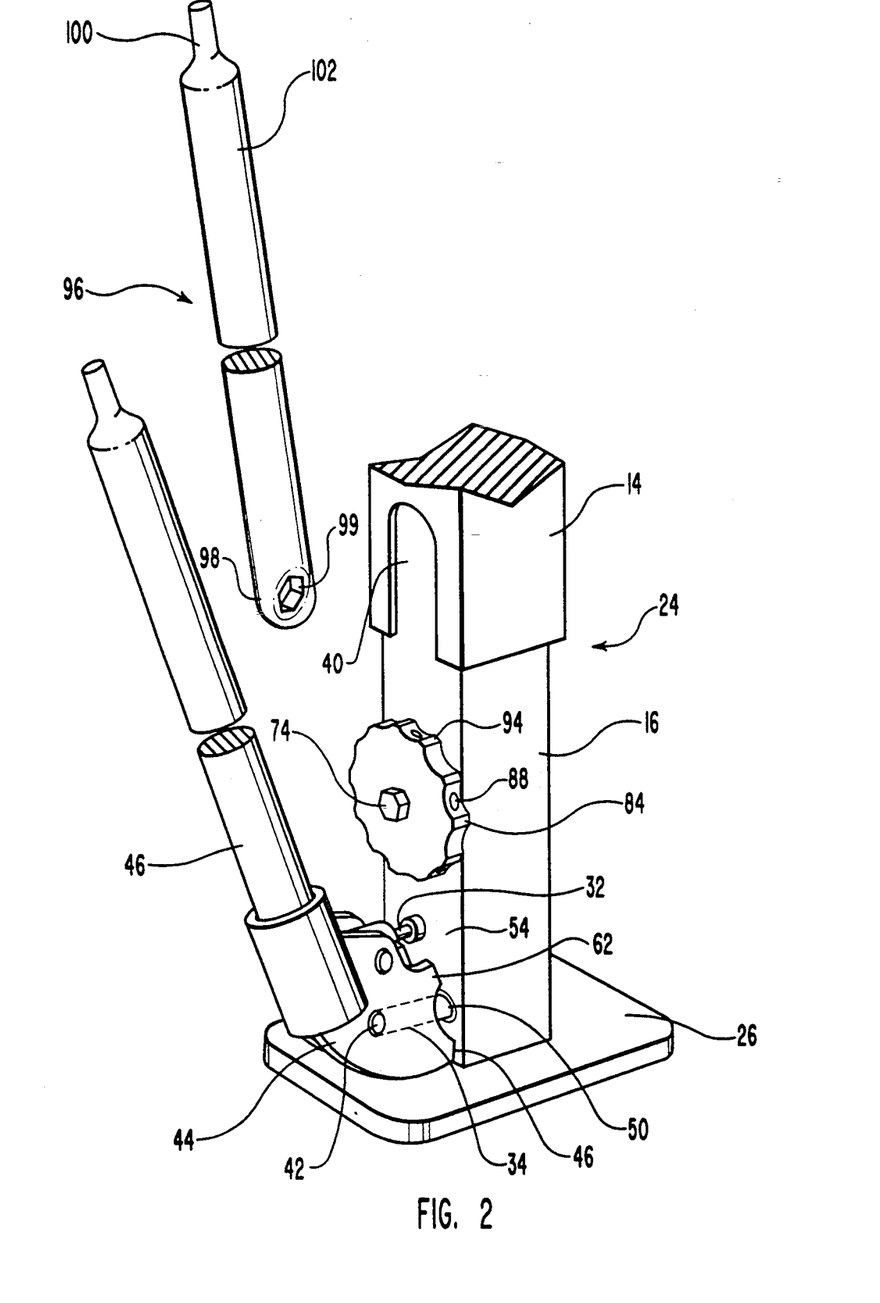
FIG. 2 illustrates a fragmentary perspective view of the valve block portion of the camper jack wherein the pump handle is inserted into the pump handle receiver.

With reference to FIG. 2, a valve block 24 is mounted upon a base plate 26, the plate 26 normally engaging the ground 18 when the leg 16 is extended. The exterior housing 14 has a configuration which complements the exterior configuration of the leg 16. Thus, in the fully retracted condition (shown in broken lines) the valve block 24 is concealed by the housing 14.

Figure 3:
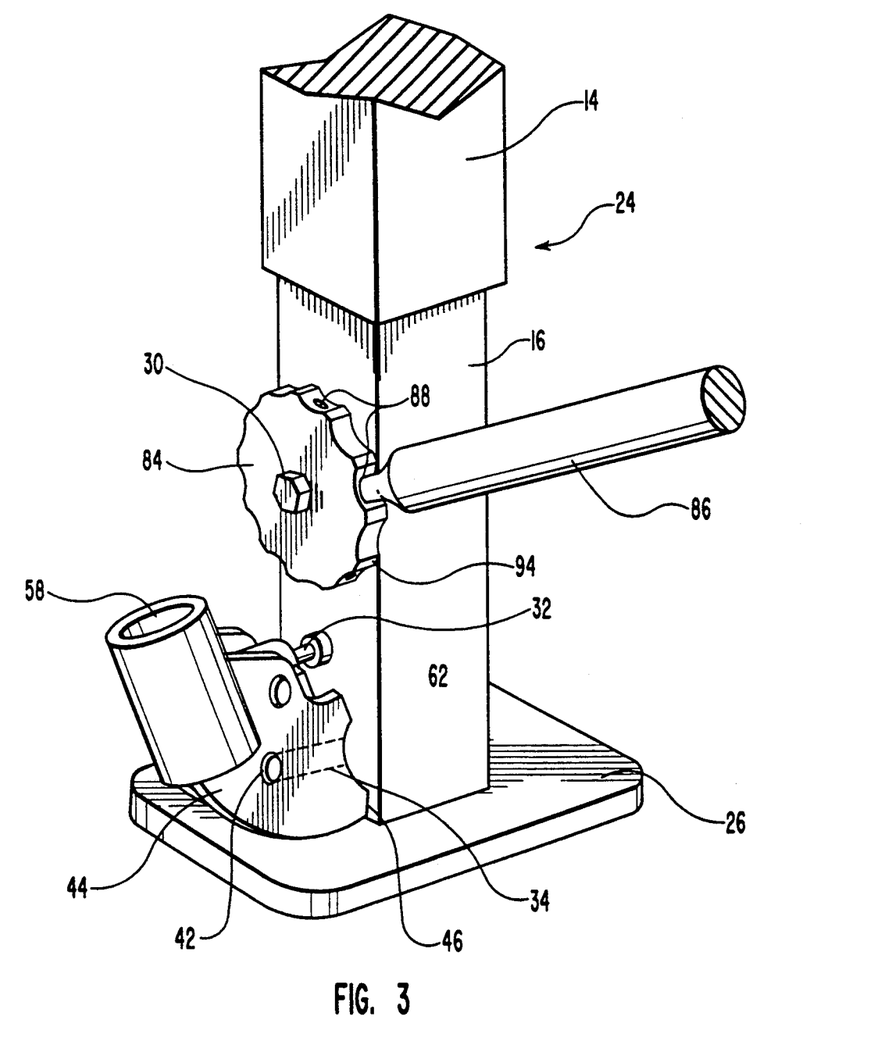
FIG. 3 illustrates a fragmentary perspective view of the valve block portion of the camper jack wherein a lever arm is inserted into the thumb wheel.

As can be seen in FIGS. 2 and 3, the hydraulic fluid control elements, including the needle valve 30, piston rod 32 and fulcrum 34 are exposed at the valve block 24 at the base of the leg 16. A cutout or notch 40 is formed in the exterior housing 14 and opens downwardly so as to receive the control elements. The cutout 40 allows the leg 16 to be completely retracted without damaging the exposed control elements.

The fulcrum 34 is pivotally connected at 42 to the lower end of a pump handle receiver 44. A pump handle 46 is removably attachable to the pump handle receiver 44. The pump handle receiver 44 is also intermediately connected to the piston rod 32. Thus, as the pump handle receiver 44 is reciprocally displaced, piston rod 32 is moved reciprocally to impart pumping action as will be more fully discussed hereinafter.

When the base plate 26 is brought into ground contact, the leg 16 can be further extended from the housing 14 by longitudinal movement of the piston rod 32.

Fulcrum 34 is pivotally connected to valve block 24 by a second pivot point 50 cooperating in a recess 52 at the base of valve block 24. Fulcrum 34 is also pivotally connected at 42 to pump handle receiver 44. Pivot points 50 and 42 at each end of fulcrum 34 permit lateral movement of pump handle receiver 44 thereby accommodating longitudinal movement of piston rod 32 perpendicular to face 54 of valve block 24.

The pump handle receiver 44 is an important novel aspect within the scope of the present invention. Pump handle receiver 44 is best pictured in FIGS. 2 and 3.

In the prior art, one problem with use of the pumping handles is that the pumping motion may be exaggerated and overextended beyond an optimum range of motion. When the pump handle 46 is moved in too great of an arc, the piston to which it is attached may be pulled out too far, or pushed in too deep, and effort needed to pump may be wasted. The pump handle receiver 44 of the present invention prevents this overextension of the piston and provides for motion of the pump handle 46 in the optimum arc.

The pump handle receiver 44 is removably attachable to the pump handle 46. A receptacle 58 is provided in the pump handle receiver 44 into which the pump handle 46 may be inserted when necessary. The pump handle receiver 44 comprises a first positive stop 62 projecting from the main body of pump handle receiver 44. At a point of inward motion of pump handle 46 where further inward motion of the piston is undesired, the first positive stop 62 contacts the exterior of the valve block 24. This contact prevents further inward motion of pump handle 46.

The pump handle receiver 44 further comprises a second positive stop 64 projecting from the main body of the pump handle receiver 44. At a point of outward motion of pump handle 46 where further outward motion of the piston is undesired, the second positive stop 64 contacts the exterior of the valve block 24. This contact prevents further outward motion of pump handle 46.

Therefore, because of the positioning of the first and second positive stops, 62 and 64, the motion of pump handle 46 towards and away from the jack is limited. Overextension of pump handle 46 is not permitted.

Figure 4:
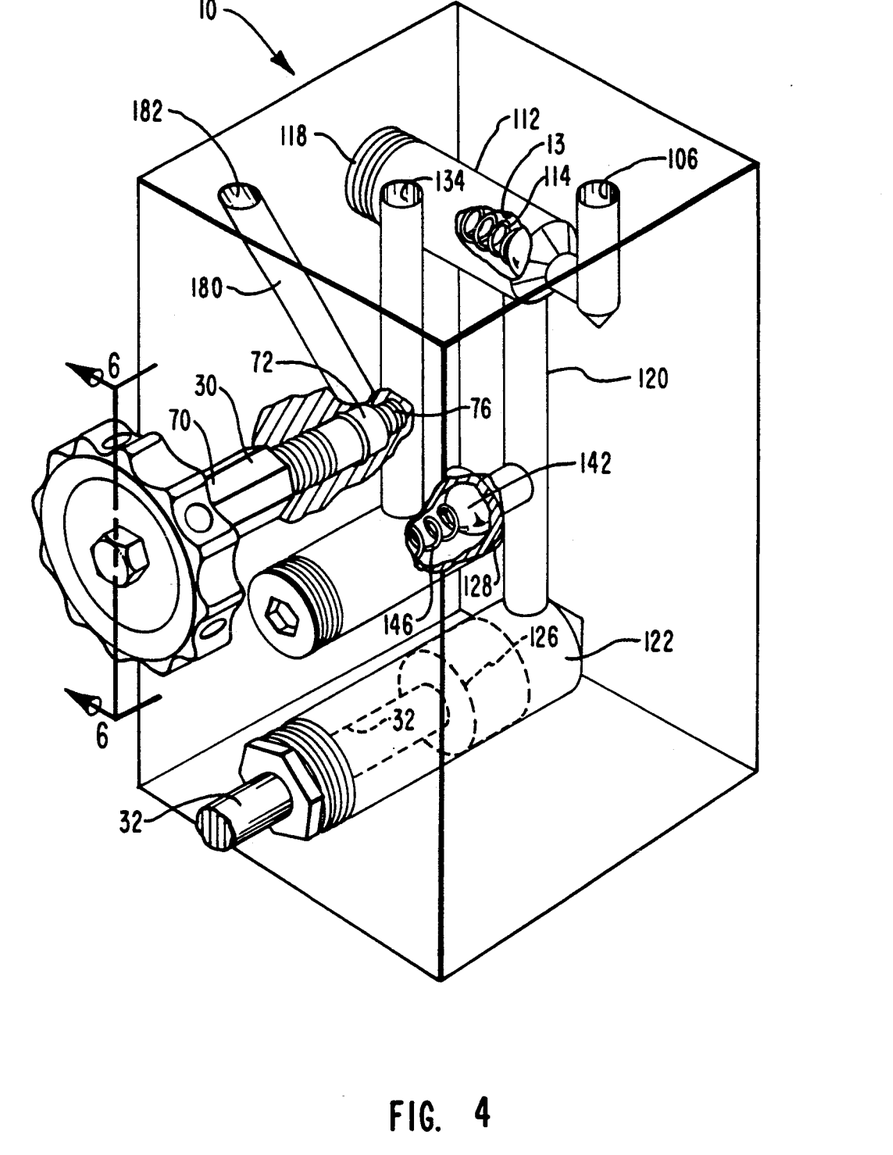
FIG. 4 illustrates a schematic perspective view of the fluid conduits and access ports of the valve block.
Figure 6:
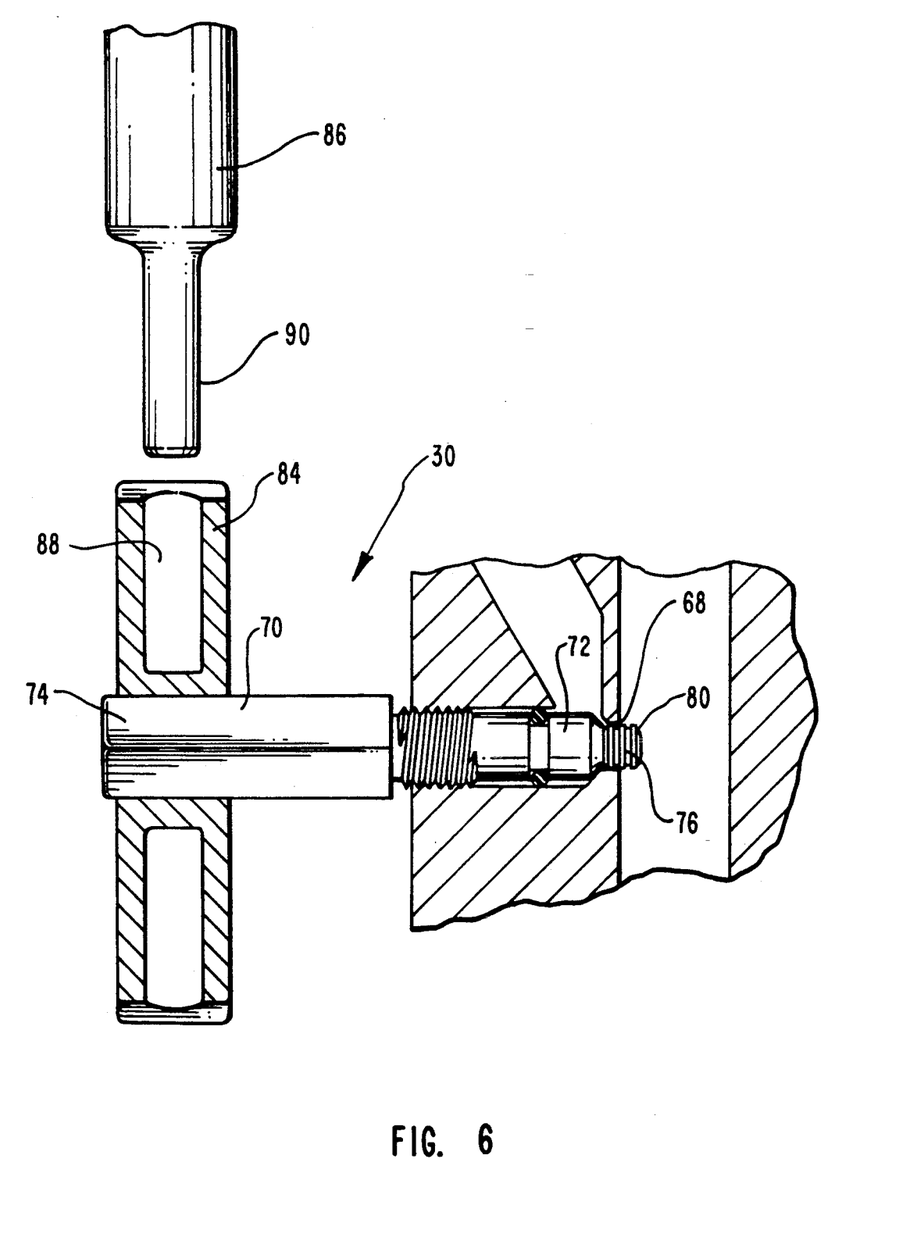
FIG. 6 illustrates a cross-sectional of the passageways wherein the novel needle valve of the present invention is inserted.

The needle valve 30, one of the hydraulic fluid control elements, is an important novel feature within the scope of the present invention. As illustrated in FIGS. 4 and 6, needle valve 30 is used to control passage of fluid within a passageway 68 between the cylinder and the reservoir. The needle valve 30 comprises a first end 70 and a second end 72, the first end 70 comprising a head 74 of the needle valve 30 and the second end 72 shaped so as to block and unblock passageway 68 during rotation of the needle valve 30.

Upon the second end 72 of the needle valve 30 are formed a plurality of grooves 76 sized so as to control the pressure and rate of flow of fluid through the passageway 68. As can be seen in FIG. 6, the plurality of grooves 76 wind around the second end 72 of needle valve 30. As the needle valve 30 is rotated, the hydraulic fluid flows through the plurality of grooves 76, and the flow of the hydraulic fluid can thus be controlled.

With needle valves of the prior art, the extremely high pressure involved causes the molecular structure of the hydraulic fluid to fracture. Adding grooves 76 to the needle valve 30 allows the hydraulic fluid to flow through the grooves 76 and the pressure to drop. It has been found that a pressure change from about 3600 psi to about 0 psi may occur when adding the grooves 76 of the present invention.

The number, depth, and length of the grooves 76 desired is dependent upon the variables of viscosity, temperature, and weight. For example, as the length is increased, the pressure is reduced. The depth and width can control the rate of flow. In the present invention, the plurality of grooves 76 has a preferable depth within the range of from about 0,003 inch to about 0.0015 inch, and more preferably within the range of from about 0.009 to about 0.0015 inch.

The shape of the multiple of grooves 76 may vary. Included in the possible shapes are a U-shape, a substantially V-shape, or a substantially square-shape. It is desirable, however, that whatever the shape used, sharp edges in the shape be avoided. It has been found that sharp edges tend to mechanically fracture the structure of the hydraulic fluid.

As can be seen in FIG. 6, a portion 80 of the second end 72 extends beyond the passageway 68. Rotation of the needle valve 30 rotates the needle valve 30 back towards the reservoir. While portion 80 remains extended beyond the passageway 68, the flow of the hydraulic fluid is constant. Once portion 80 enters the passageway 68, the flow becomes metered. As stated earlier, the size and number of the grooves 76 can control the rate of flow.

Control of rotation of the needle valve 30 is another important feature within the scope of the present invention. This control is provided by rotation means connectable to the needle valve 30 for effecting controlled rotation of the needle valve 30.

As illustrated in FIGS. 2 and 3, in one embodiment of the present invention, the rotation means comprises a thumb wheel 84 tightly secured to the needle valve 30 so as to provide a handle for rotating the needle valve 30. The thumb wheel 84 is compression fit on needle valve 30 such that thumb wheel 84 provides a positive stop against the valve block 24 so as to prevent overrotation of the needle valve 30 and prevent leaking around the needle valve 30 when the thumb wheel 84 is pressed against the valve block 24. It can be appreciated that if overrotated, the needle valve 30 may break.

It is within the scope of the present invention that the thumb wheel 84 be adaptable to allow a lever arm 86 to be connected to the thumb wheel 84 in order to provide leverage for rotation of needle valve 30. At least one orifice 88 is positioned along the surface of the outer circumference of thumb wheel 84. The at least one orifice 88 permits insertion of the lever arm 86 into the orifice 88 so as to allow connection of lever arm 86 with the thumb wheel 84.

As best seen in FIG. 6, lever arm 86 comprises an elongated structure having a corresponding pin 90 thereon. The corresponding pin 90 is sized so as to comfortably and securely fit into the at least one orifice 88. Once the thumb wheel 84 and lever arm 86 are connected, movement of the lever arm 86 can effect rotation of the thumb wheel 84, and thereby effect rotation of the needle valve 30. By the addition of the lever arm 86, leverage is provided, and finer control of the rotation can be achieved. This fine control can be achieved due to the fact that a large movement of the lever arm 86 will cause only a small movement of the needle valve 30.

Another advantage with having the thumb wheel 84 be adaptable to attachment of a lever arm 86 is that the needle valve 30 can be controlled by the user at an area distant from the jack assembly 12. Therefore, if any accident occurs wherein the jack assembly 12 suddenly extends or collapses without notice, the fingers and hands of the user will not be in the area where possible injuries could occur.

However, control of the thumb wheel 84 by hand is also still possible. The thumb wheel 84 may be either smooth or ridged around its outer circumference. The outer circumference of the thumb wheel 84 may be comprised of ridges 94 which provide the user with a secure fingerhold with which to rotate the needle valve 30. The at least one orifice 88 for connection with a lever arm 86 may be present in either the smooth or rigid embodiments of the thumb wheel 84.

In an alternate embodiment within the scope of the present invention (FIG. 2), the means for effecting controlled rotation of the needle valve 30 comprises a wrench 96 having two ends thereon. The first end 98 of the wrench 96 comprises a head 99. The second end 100 of the wrench 96 may comprise a handle 102. The head 99 of the wrench 96 conforms to the shape of the head 74 of the needle valve 30 such that the wrench head 99 can be easily and securely attached to needle valve 30. Once attached, rotation of the wrench 96 would effect rotation of the needle valve 30. For example, in the preferred embodiment, the head 74 of the needle valve 30 comprises a hexagonal shape. The corresponding wrench head would then also comprise a hexagonal shape.

Different types of wrenches may be used to effect rotation of the needle valve 30. In the preferred embodiment, a box end wrench is used. With a box end wrench, the wrench head can be slipped over the head 74 of the needle valve 30 and can remain in place even if the hands are removed from the wrench. However, an open end wrench, which would fall away if the hands of the user were removed, may also be used within the scope of the present invention.

In one embodiment within the scope of the present invention, the second end 100 of the wrench 96 comprises an alternate second wrench head for use if the first wrench head were to break. The alternate second wrench head may be covered by a removable handle grip (not shown) so that when not needed, the second wrench head may be used as a handle. When the second wrench head is needed, the handle grip may be removed and placed onto the first end 98, thereby making the first end into the handle.

It is also within the scope of the present invention that the wrench 96 may further comprise a long lever arm for providing leverage in rotation of the needle valve 30.

Additionally, the wrench 96 with lever arm 86 may also be used as the lever arm 86 for controlling rotation of the thumb wheel 84. At one end of the lever arm 86 may be positioned the wrench head 99. At the opposite end of the lever arm 86 may be positioned the corresponding pin 90 which is conformed to fit into the at least one orifice 88 of the thumb wheel 84. By this embodiment, one lever arm 86 can be used for both the wrench 96 and with the thumb wheel 84.

During rotation of the needle valve 30, it is unfortunately the case that often the needle valve 30 is overrotated, thereby causing its head 74 to be broken off. The present invention prevents overrotation of the needle valve 30. As stated earlier, the thumb wheel 84 provides a positive stop for the needle valve 30. Pressure of the thumb wheel 84 against the exterior housing 14 of the jack assembly 12 prevents the needle valve 30 from being overrotated by the thumb wheel 84.

The wrench head 99 may also be manufactured so that it also prevents overrotation. It is preferred that the wrench 96 be comprised of a plastic material having a hardness and stiffness such that the wrench head 99 will slip over rather than break the needle valve 30 at the point where rotation of the needle valve 30 should be halted. After slipping off the head 74 of the needle valve 30, the plastic material would allow the wrench head 99 to reconform to its original shape whereby the wrench head can then be used again. A preferred material is polyurethane.

The extensible leg 16 terminating in the valve block 24, is shown best in FIGS. 2-4. Referring particularly to FIG. 4, valve block 24 is shown by broken lines whereas the associated hydraulic fluid regulating components contained therein are emphasized.

The apparatus of valve block 24 is more easily understood by reference to the hydraulic circuit shown best in FIG. 4. Hydraulic fluid enters valve block 24, in part, through an inlet port 106 from a fluid reservoir 108 (FIGS. 4 and 5) and passes through a one-way check valve 110. Check valve 110 includes a valve cavity 112 and a ball 114. Ball 114 is held against a ball valve seat (not shown) by the compressive force of spring 116.

After passing through check valve 110, the hydraulic fluid traverses conduit 120 into a pumping piston reservoir 122. A pumping piston 126 operating in the reservoir 122 produces positive and negative pressures in the conduit 120. Negative pressure in reservoir 122 creates the necessary pressure differential across check valve 110 to cause unidirectional fluid flow into conduit 120.

Hydraulic fluid under positive pressure in reservoir 122 and, subsequently conduit 120, is prevented from returning to inlet 106 by check valve 110 and forces a second check valve 128 open. The hydraulic fluid passes through second check valve 128 and a second conduit 132 to exit port 134. Exit port 134 is the entrance to the jack piston reservoir 136 (FIG. 5) of the jack cylinder 138.

A second ball 142 of second check valve 128 is held by a second spring 146 against a ball valve seat (not shown) in a manner similar to check valve 110.

Accordingly, cyclic operation of piston 126 by action upon piston rod 32 cyclically fills and empties reservoir 122 with the direction of fluid flow through conduits 120 and 132 being unidirectionally controlled by one-way check valves 110 and 128. The foregoing action provides hydraulic fluid under positive pressure at exit port 134.

Figure 5:
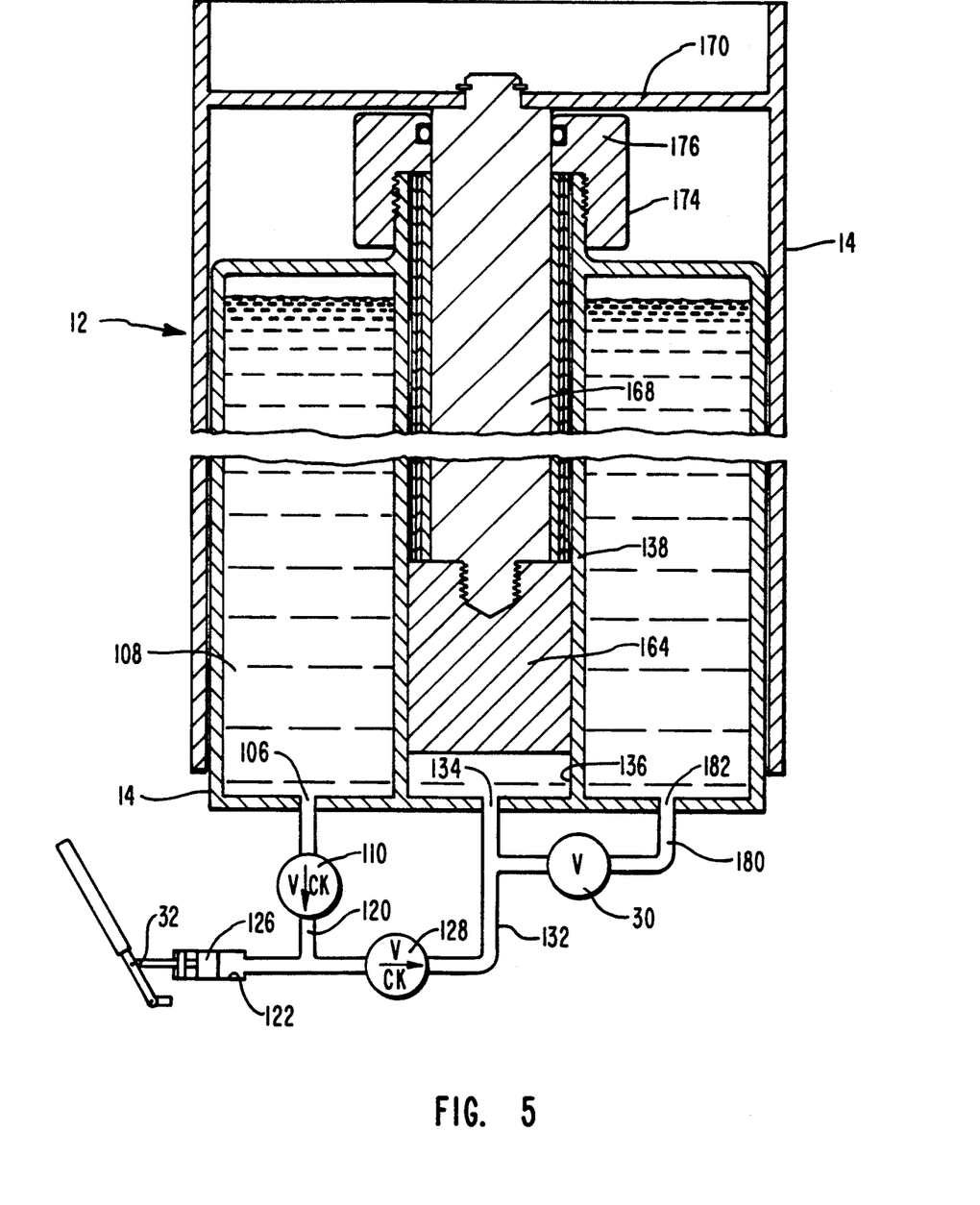
FIG. 5 illustrates a cross-sectional view of the camper jack with the hydraulic fluid conduits being shown schematically.

Reference is now made to FIG. 5. Extensible leg 16 is hollow, forming a hydraulic fluid reservoir 108. Centrally disposed in the hydraulic fluid reservoir 108 is the cylinder 138 which is in fluid communication with reservoir 108 through the previously described port 134. A jack piston 164 reciprocally disposed within cylinder 138 is attached to one end of a middle piston rod 168 which is, in turn, connected to a plate 170. Plate 170 is an integral part of the housing 14. Movement of jack piston 164 is controlled by pressure of hydraulic fluid entering cylinder 138 through port 134.

Packing nut 174 and packing 176 provide a hydraulic seal for middle piston rod 168. Packing nut 174 prevents inadvertent removal of jack piston 164 from cylinder 138 and seals the distal end of cylinder 138.

Accordingly, hydraulic fluid reservoir 108 is formed in the peripheral space about cylinder 138 and extends substantially the entire length of cylinder 138. With this particular embodiment it is, therefore, possible to obtain a relatively large capacity hydraulic fluid reservoir to permit extension of piston 40 to substantially the entire length of cylinder 138.

Hydraulic fluid from the cylinder 138 is returned to the hydraulic fluid reservoir 108 through a third conduit 180. Needle valve 30 controls the flow of hydraulic fluid through third conduit 180.

To displace piston 164, hydraulic fluid enters the inlet port 106 from reservoir 108 and passes through first check valve 110 and conduit 120 into reservoir 122 when negative pressure exists either in piston cylinder 108 or in piston reservoir 122. Positive pressure in piston reservoir 122 forces the hydraulic fluid through second check valve 128 into second conduit 132 where it passes through exit port 134 into the cylinder 138 to cause longitudinal movement of piston 164 and hence extension of leg 16. Maintaining valve 30 in the closed position prevents the flow of fluid from cylinder 138 and thus maintains the jack piston 164 and, consequently, housing 14 and extensible leg 16 in the preselected relative position.

By opening needle valve 30, hydraulic fluid is permitted to escape from cylinder 138 through third conduit 180 and port 182 into the fluid reservoir 108. Accordingly, loss of hydraulic fluid from cylinder 138 permits retraction of the extensible leg 16 into housing 14.

With the one-way check valve system of the valve block 24 of the illustrated embodiment of the invention, it is possible to manually extend or retract leg 16 of the jack. During manual extension, hydraulic fluid is drawn through first check valve 110 and second check valve 128 into the jack cylinder 138 by the negative pressure created in the jack cylinder 138. Cessation of the negative pressure in jack cylinder 138 stops the inflow of hydraulic fluid and second check valve 128 prevents the flow of hydraulic fluid in the reverse direction.

Closure of needle valve 30 coupled with the automatic closure of check valve 128 accordingly entraps the hydraulic fluid in cylinder 138 thereby establishing the position of extensible leg 16 relative to housing 14. Retraction of extensible leg 16 into housing 14 of the jack is accomplished by manually operating needle valve 30.

Figure 7:
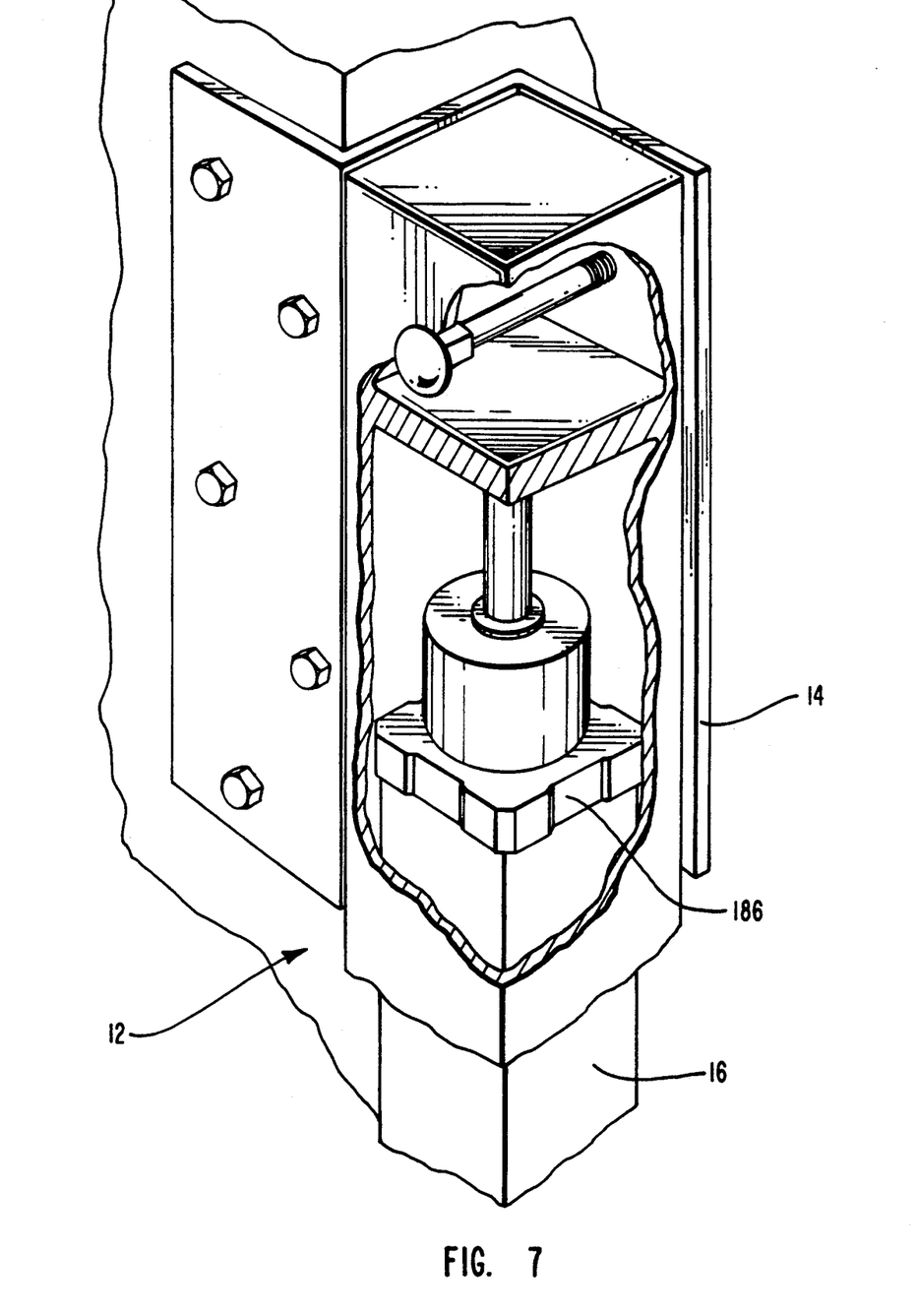
FIG. 7 illustrates a broken away view of the novel guide washer of the present invention.

A final novel feature within the scope of the present invention is a novel wear guide washer 186 as illustrated in FIG. 7. The guide washer 186 is inserted between external housing 14 and the extensible leg 16. The guide washer 186 allows the external housing and the extensible leg 16 to be held together as tightly as possible. This allows the camper jack to minimize sway.

With the guide washer 186 of the present invention, a larger wear surface is provided. The guide washer 186 is simple to mold, easy to replace, easy to use, and inexpensive.

In the prior art, there is a one-fourth inch space between the exterior housing and the leg. This space allows much swaying of the camper. The guide buttons of the prior art are fingernail size. With the present invention, however, the guide buttons can be much larger. The space in the present invention is about 30/1000 inch.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. An improved extensible jack assembly comprising:
   a) a piston hydraulically operable in a cylinder;
   b) a hydraulic fluid reservoir surrounding the cylinder along a substantial portion of its length;
   c) a housing connected to the piston;
   d) a valve block coextensive with the reservoir and at the base of the cylinder, said valve block fitting telescopically within the housing and comprising at least one hydraulic conduit therein in fluid communication between the reservoir and cylinder and having at least one check valve in the conduit; and
   e) hydraulic fluid pumping means for pumping fluid from the reservoir to the cylinder, said hydraulic fluid pumping means comprising control mechanisms comprising a needle valve for controlling the flow of hydraulic fluid within a passageway between the cylinder and the reservoir, the needle valve having a first end comprising the head of the needle valve and a second end shaped so as to enter and block said passageway during rotation of the needle valve towards said passageway, the second end having thereon a plurality of grooves winding around the second end of the needle valve and sized so as to control the pressure and rate of flow of fluid through the passageway during release of the needle valve.

2. An improved extensible jack assembly as defined in claim 1, wherein the depth of the plurality of grooves located on the second end of the needle valve is within the range of about 0.009 to about 0.015 inch.

3. An improved extensible jack assembly as defined in claim 1, wherein the depth of the plurality of grooves located in the needle valve is within the range of about 0.003 to about 0.015 inch.

4. An improved extensible jack assembly as defined in claim 1, wherein the size of the plurality of grooves located on the second end of the needle valve is dependent upon the variables of viscosity, temperature, and weight.

5. An improved extensible jack assembly as defined in claim 1, further comprising a piston rod in pressure communication with the passageways between the reservoir and the cylinder, pumping movement of the piston rod producing positive and negative pressures in said passageways so as to pump fluid from the reservoir to the cylinder, the piston rod being connected to and the pumping movement of the piston rod being controlled by movement of a pump handle receiver, the pump handle receiver configured so as to prevent overextension of the piston rod, and the pump handle receiver removably attachable to a pump handle.

6. An improved extensible jack assembly as defined in claim 5, wherein the pump handle receiver comprises:
   a) a first positive stop projecting from the pump handle receiver so as to contact, at a point of inward motion of the pump handle where further inward motion of the piston is undesired, the exterior of the jack, the contact thereby preventing further inward motion of the pump handle; and
   b) a second positive stop projecting from the pump handle receiver so as to contact, at a point of outward motion of the pump handle where further outward motion of the piston is undesired, the exterior of the jack, the contact thereby preventing further outward motion of the pump handle.

7. An improved extensible jack assembly as defined in claim 1, wherein the head of the needle valve comprises a hexagonal shape.

8. An improved extensible jack assembly as defined in claim 1, further comprising rotating means for effecting rotation of the needle valve.

9. An improved extensible jack assembly as defined in claim 8, wherein the rotating means comprises a wrench having two ends, the first end of the wrench comprising a head and the second end of the wrench comprising a handle, the head of the wrench conforming to the shape of the head of the needle valve such that the wrench head can be easily and securely attached to needle valve such that rotation of the wrench effects rotation of the needle valve.

10. An improved extensible jack assembly as defined in claim 9, further comprising an alternate second wrench head positioned on the second end of the wrench.

11. An improved extensible jack assembly as defined in claim 9, wherein the wrench is comprised of a plastic material having a sufficient hardness and flexibility such that the wrench head can be securely attached to the needle valve such that rotation of the wrench effects rotation of the needle valve, yet will not effect overrotation, in that the wrench head will slip over the needle valve rather than break the needle valve if the pressure becomes too great upon the needle valve.

12. An improved extensible jack assembly as defined in claim 9, wherein the wrench further comprises a lever arm for fine control in turning the needle valve.

13. An improved extensible jack assembly as defined in claim 8, wherein the rotating means comprises a thumb wheel tightly secured to the needle valve in a compression fit such that the thumb wheel provides a positive stop against the jack to prevent overrotation of the needle valve, and a handle is provided for effecting rotation of the needle valve.

14. An improved extensible jack assembly as defined in claim 13, wherein the outer circumference of the thumb wheel is comprised of ridges, the ridges allowing a secure fingerhold on the needle valve.

15. An improved extensible jack assembly as defined in claim 14, wherein the thumb wheel further comprises at least one orifice along the surface of the outer circumference of the thumb wheel, the at least one orifice permitting insertion of a corresponding pin of a lever arm into the thumb wheel such that rotation of the thumb wheel can be accomplished by movement of the lever arm, thereby providing leverage and fine control in rotation of the needle valve.

16. An improved extensible jack assembly as defined in claim 13, wherein the thumb wheel further comprises at least one orifice along the surface of the outer circumference of the thumb wheel, the at least one orifice permitting insertion of a lever arm into the thumb wheel such that rotation of the thumb wheel can be accomplished by movement of the lever arm, thereby providing leverage and fine control for rotation of the needle valve.

17. An improved extensible jack assembly as defined in claim 13, wherein the thumb wheel is comprised of a plastic material.

18. An improved extensible jack assembly as defined in claim 13, wherein the thumb wheel is comprised of polyurethane.

19. An improved extensible jack assembly comprising:
- a) a piston hydraulically operable in a cylinder:
- b) a hydraulic fluid reservoir surrounding the cylinder along a substantial portion of its length;
- c) a housing connected to the piston;
- d) a valve block coextensive with the reservoir and at the base of the cylinder, said valve block, fitting telescopically within the housing and comprising at least one hydraulic conduit therein in fluid communication between the reservoir and cylinder and having at least one check valve in the conduit; and
- e) hydraulic fluid pumping means for pumping fluid from the reservoir to the cylinder, said hydraulic fluid pumping means comprising:
  - i) a needle valve for controlling the flow of hydraulic fluid within a passageway between the cylinder and the reservoir, the needle valve having a first end comprising the head of the needle valve and a second end shaped so as to enter and block said passageway during rotation of the needle valve towards said passageway, the second end having thereon a plurality of grooves sized so as to control the pressure and rate of flow of fluid through the passageway; and
  - ii) a piston rod in pressure communication with the passageways between the reservoir and the cylinder, pumping movement of the piston rod producing positive and negative pressures in said passageways so as to pump fluid from the reservoir to the cylinder, the piston rod being connected to and the pumping movement of the piston rod being controlled by a pump handle receiver configured so as to prevent overextension of the piston rod, the pump handle receiver removably attachable to a pump handle, the pump handle receiver comprising a first positive stop projecting from the pump handle receiver so as to contact, at the point of inward motion of the pump handle where further inward motion of the piston is undesired, the exterior of the extendible wall of the jack, the contact thereby preventing further inward motion of the pump handle, and a second positive stop projecting from the pump handle receiver so as to contact, at a point of outward motion of the pump handle where further outward motion of the pump handle is undesired, the exterior of the extendible wall of the jack, the contact thereby preventing further outward motion of the pump handle; and
  - iii) a fulcrum pivotally connected at one end to the pump handle receiver and at a second end to the valve block, the fulcrum allowing inward and outward pivoting movement of the pump handle so as to provide pumping movement of the piston rod.

20. An improved extensible jack assembly comprising:
- a) a piston hydraulically operable in a cylinder:
- b) a hydraulic fluid reservoir surrounding the cylinder along a substantial portion of its length;
- c) a housing connected to the piston;
- d) a valve block coextensive with the reservoir and at the base of the cylinder, said valve block, fitting telescopically within the housing and comprising at least one hydraulic conduit therein in fluid communication between the reservoir and cylinder and having at least one check valve in the conduit; and
- e) hydraulic fluid pumping means for pumping fluid from the reservoir to the cylinder, said hydraulic fluid pumping means comprising:
  - i) a needle valve for controlling the flow of hydraulic fluid within a passageway between the cylinder and the reservoir, the needle valve having a first end comprising the head of the needle valve and a second end shaped so as to enter and block said passageway during rotation of the needle valve towards said passageway, the second end having thereon a plurality of grooves sized so as to control the pressure and rate of flow of fluid through the passageway during release of the needle valve;
  - ii) a thumb wheel tightly secured to the needle valve in a compression fit such that the thumb wheel provides a positive stop against the jack to prevent overrotation of the needle valve, and a handle for effecting rotation of the needle valve, said thumb wheel being adaptable to be connected with a lever arm to provide leverage in the rotation of the needle arm;
  - iii) a piston rod in pressure communication with the passageways between the reservoir and the cylinder, pumping movement of the piston rod producing positive and negative pressures in said passageways so as to pump fluid from the reservoir to the cylinder, the piston rod being connected to and the pumping movement of the piston rod being controlled by movement of a pump handle receiver, the pump handle receiver configured so as to prevent overextension of the piston rod, and the pump handle receiver removably attachable to a pump handle; and
  - iii) a fulcrum pivotally connected at one end to the pump handle receiver and at a second end to the valve block, the fulcrum allowing inward and outward pivoting movement of the pump handle so as to provide pumping movement of the piston rod.

* * * * *